United States Patent [19]

Andersson et al.

[11] 4,212,569
[45] Jul. 15, 1980

[54] TUBULAR DRILL TOOL

[75] Inventors: Allan Andersson, Kungsgården; Bert Bergström, Sandviken, both of Sweden

[73] Assignee: Sandvik Aktiebolag, Sandviken, Sweden

[21] Appl. No.: 829,456

[22] Filed: Oct. 6, 1977

[51] Int. Cl.² .............................................. B23B 51/06
[52] U.S. Cl. ........................................ 408/59; 408/144; 408/226
[58] Field of Search ................ 408/705, 59, 200, 144, 408/226, 207, 199

[56] References Cited
U.S. PATENT DOCUMENTS

| | | | |
|---|---|---|---|
| 2,418,021 | 3/1947 | Fleischer | 408/59 |
| 2,882,765 | 4/1959 | Andreasson | 408/144 X |
| 3,010,345 | 11/1961 | Wagner | 408/59 |

FOREIGN PATENT DOCUMENTS 1329689  9/1973  United Kingdom ...................... 408/59

*Primary Examiner*—Gil Weidenfeld
*Attorney, Agent, or Firm*—Burns, Doane, Swecker & Mathis

[57] ABSTRACT

The drill tool of the present invention comprises a profiled tubular drill shank with a drill head, which consists of the free part of the drill shank with guide strips and cutting element fastened to it, characterized in that the cutting element (3) is fixed in a position pressed or forged into the drill shank (1).

8 Claims, 9 Drawing Figures

TUBULAR DRILL TOOL

The present invention relates to a drill tool for drilling deep holes, and comprises a drill shank and a drill head, provided with guide strips and a cutting element, which preferably are made of sintered carbide, ceramic or another hard alloy. Such drill tools are provided with one or several passages extending through the tool in its longitudinal direction which passages are used for carrying away chips. The drill tools, which are usually called gun drills and especially used for drill diameters between 3–20 mm, work in the following way: Cutting medium is carried under high pressure in passages extending through the drill shank and drill head to the cutting place, whereafter the cutting medium with chips is carried away out of the drill hole through a profiled passage. A previously known drill in this field comprises a profiled, tubular shank with a compact drill head welded or soldered to the shank, which drill head is usually made of sintered carbide.

For getting the best possible cooling of the cutting place and for guaranteeing good transportation of chips a great area of passages extending through the drill head is pursued. In this connection, there is a great risk that the drill head, if it is made wholly of sintered carbide, becomes so greatly weakened after hollowing out of passages that, partly, great difficulties of manufacture arise with accompanying discard of material due to cracking, and that the drill head can easily burst when used, as sintered carbide is a brittle material. A compact drill head of sintered carbide is unnecessarily expensive and heavy since that material is expensive to manufacture and has high density. Moreover, it is hard and time-consuming to drill a hole in such a compact body of sintered carbide. Furthermore, a soldering joint or weld joint between drill head and drill shank is a weak point, in the drill tool, and here breaking often appears when the drill is used.

Yet another drawback resides in the fact that cutting insert and guide strips are of the same material if the drill head is wholly made of sintered carbide. That means that a material which has optimum characteristics both regarding cutting effect and wear cannot be chosen. As a principle, the cutting element shall be chosen with regard to its ability to perform a cutting work, while the material of the guide strips shall be chosen with regard to their ability to take up the forces which act on the drill head, and to minimize the wear which arises at contact with the bored hole.

The present invention is intended to avoid the problems which are associated with the previously known technique in this field, and is described more thoroughly in connection with the following drawing, in which.

Figure 1:
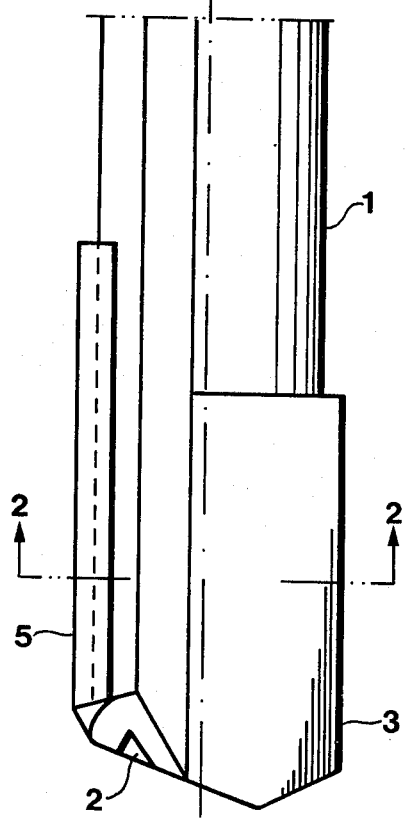
FIG. 1 is a plan view of a single-cutting element drill according to the invention.
Figure 3:
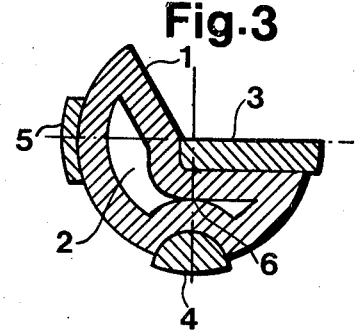
FIGS. 3–9 are sections of different embodiments of the drill taken along a line corresponding to 2—2 of FIG. 1.
Figure 2:
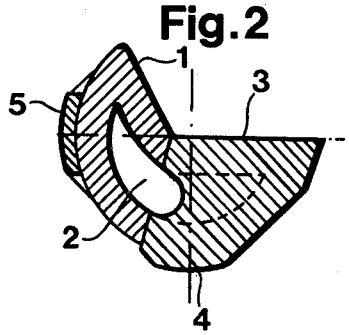
FIG. 2 is a section taken along 2—2 of FIG. 1.

FIGS. 1 and 2 disclose a drill, the drill shank 1 of which comprises a profiled tube and is therefore provided with an interior hole 2 for carrying cutting-medium to the drill head. The cutting element 3 comprises a sector-formed cutting insert of sintered carbide, which insert is fastened to that free part of the drill shank comprising the drill head in a suitable way of soldering, gluing or clamping. In the embodiment illustrated in FIGS. 1 and 2, the cutting element 3 and one 4 of the guide strips are manufactured in one piece, whereby the object of the guide strip 4 is to take up the tangential cutting forces acting on the cutting insert, which forces are directly transferred to the guide strip 4. Due to the fact that the cutting insert 3 and the guide strip 4 are made of a homogeneous piece, a drill head with great stability is obtained. This stability also depends on the fact that the cutting element 3 does not need to be hollowed out so extensively in order to attain the wished hole-area for the cutting head. As is said earlier the cutting element 3 only takes up a sector and is fastened onto a tubular shank, whereby the desired hole-area is easy to attain.

The main object of the other guide strip, guide 5, is to lead the drill in the hole correctly and to take up the resultant radial cutting force acting on the cutting insert. The guide 5 can be made of a homogenous piece of a wear-resistant hard alloy, and it can be fastened to the drill shank by soldering, gluing or clamping. The guide 5 can also be made of a hard alloy, which is squirted or sputtered on according to flame or plasma method or another similar known covering method.

Guide 5 is separate from the cutting insert 3 and the first guide strip 4. Due to this fact, the guide 5 can be made of a special material, which has maximal wear-resistance.

FIGS. 3–6 disclose other inventive embodiments where cutting insert 3 is made of a relatively thin, rectangular plate of sintered carbide or another wear-resistant hard alloy. The plate is laid in a position pressed or forged into the shank and fastened by soldering, gluing or clamping. The guide strip 4, which is separate from the cutting plate 3 and made of a suitable wear-resistant material, for instance sintered carbide, is fixed in a position pressed or forged into the shank. The other guide strip, guide 5, is separate both from the cutting plate 3 and from the first guide strip 4, and is made of a suitable wear-resistant material, for instance some type of sintered carbide.

The cutting forces acting on the cutting insert can be directly transferred through the drill shank to the guide strips. This especially has reference to the greatest acting cutting force, the tangential force, which in the embodiments according to FIGS. 3–6 is directly transferred to the guide strip 4 lying under the cutting plate 3, owing to the fact that the tube walls 6 are in contact with each other under the insert 3. Even that part of the tube wall lying towards the guide strip 5 can be in contact with the part of the tube wall lying towards the insert 3. The parts 3, 4 and 5 suitably can be manufactured of three different kinds of material in order to be able to overcome in an optimum way the different type of wear stresses, which can act due to the material being machined and to the cutting-data being used.

Figure 4:
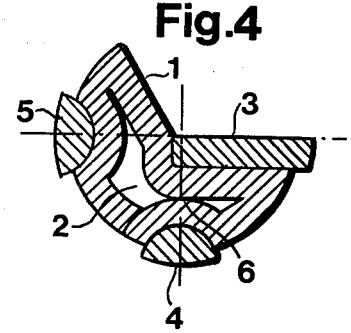
Figure 5:
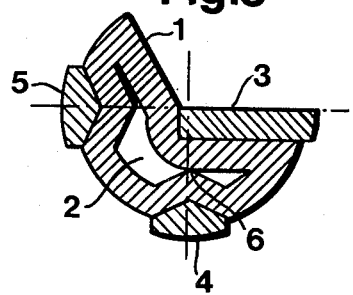
Figure 6:
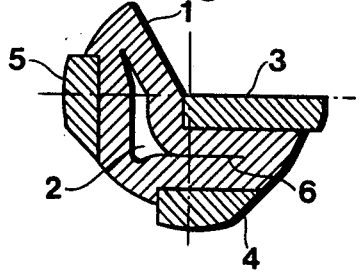

FIGS. 3–6 differ from each other in that the guide strip 4 and guide 5 have different forms. Thereby the guide 5 can be made of a hard alloy sputtered or squirted onto the tube wall as in FIG. 3 or be fixed in a position forged or pressed into the tube wall as illustrated in FIGS. 4–6.

Figure 7:
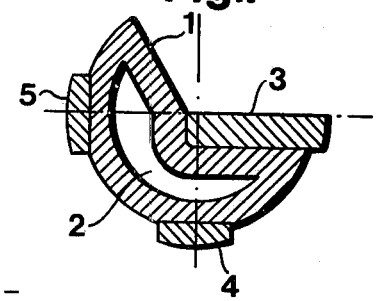
Figure 8:
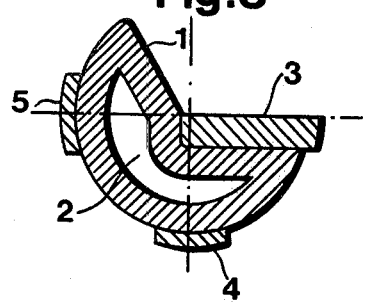
Figure 9:
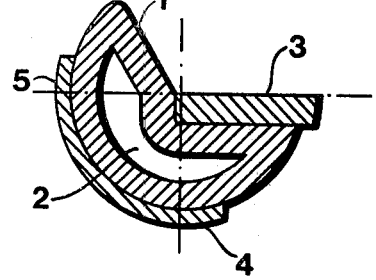

FIGS. 7–9 disclose embodiments wherein the cutting insert 3 (as in the embodiments according to FIGS. 3–6) comprises a relatively thin plate which is laid in a position pressed or forged into the drill shank and is fastened by soldering, gluing or clamping. This construction admits an extremely stable fastening of the cutting insert, and minimizes the risk that the cutting insert might come loose. The intention with the three last embodiments is to provide for the need of drills where the demand for supplying cutting-medium is very strong. Therefore, no pressing-in of the tube walls is made in these cases, in order that the hole area shall not be diminished. Thus, in order to get the greatest hollow space the guide strips 4 and 5 can wholly or partially consist of thin layers of hard alloy applied on the drill shank, which alloy is adapted to the material that shall be machined. This application can be made by known methods such as for instance flame- or plasma coating. In this relationship the guide strips 4 and 5 can be composed of a continuous layer which extends along a substantial part of the jacket area of the tube wall, as is shown in FIG. 9. The guide strips 4 and 5 can also be composed of homogeneous rectangular strips of a wear-resistant alloy and be fastened to surfaces plane milled or plane ground in the tube wall.

We claim

1. Drill tool comprising a tubular drill shank providing an internal longitudinal passage formed by a continuous constant thickness wall of the tubular shank, said passage extending to an outer end of said shank for conducting a cutting medium, said constant thickness wall including two planar wall portions at an angle extending longitudinally of the tool, and a non-planar wall portion extending between the outer ends of the planar wall portions, at least one of said planar wall portions having an external planar face, a cutting element fastened to and extending beyond said planar face so that the element is separated from the cutting medium conducted by said passage by said wall of the tubular shank, and at least one guide strip on the shank.

2. Drill tool according to claim 1, wherein said planar face of the drill shank to which the cutting element is fixed comprises an inwardly deformed portion of the drill shank whereby the wall of said shank is uninterrupted in a circumferential direction.

3. Drill tool according to claim 1, wherein the cutting element comprises a plate of hard material.

4. Drill tool according to claim 1, wherein an additional guide strip is provided on the shank.

5. Drill tool according to claim 2, wherein said at least one guide strip is fixed within a depression in the non-planar wall portion.

6. Drill tool according to claim 5, wherein the deformed portion of said shank on which said face is formed and the depressed portion of said shank which defines said depression include internal surfaces which contact one another.

7. Drill tool according to claim 1, wherein said at least one guide strip comprises a continuous coating which extends circumferentially along a substantial portion of said non-planar wall portion.

8. Drill tool according to claim 1, wherein the cutting element and guide strip are made of sintered carbide.

* * * * *